US011186263B2

(12) United States Patent
Klein et al.

(10) Patent No.: US 11,186,263 B2
(45) Date of Patent: Nov. 30, 2021

(54) ELECTROMECHANICAL BRAKE BOOSTER, VEHICLE BRAKE SYSTEM AND ASSEMBLY FOR THIS

(71) Applicant: ZF Active Safety GmbH, Koblenz (DE)

(72) Inventors: Jennifer Klein, Niederkasse (DE); Kurt Wingender, Hartenfels (DE); Jose Manuel Calvo, Kruft (DE); Marcus Höbner, Koblenz (DE); Jörg Rönz, Muelheim Kaerlich (DE)

(73) Assignee: ZF Active Safety GmbH, Koblenz (DE)

( * ) Notice: Subject to any disclaimer, the term of this patent is extended or adjusted under 35 U.S.C. 154(b) by 174 days.

(21) Appl. No.: 16/532,564

(22) Filed: Aug. 6, 2019

(65) Prior Publication Data
US 2020/0047733 A1 Feb. 13, 2020

(30) Foreign Application Priority Data
Aug. 7, 2018 (DE) .......................... 102018006237.7

(51) Int. Cl.
*B60T 13/74* (2006.01)
*B60T 13/62* (2006.01)
(52) U.S. Cl.
CPC ............ *B60T 13/745* (2013.01); *B60T 13/62* (2013.01); *B60T 2270/402* (2013.01); *B60T 2270/82* (2013.01)

(58) Field of Classification Search
CPC ............ B60T 13/745; B60T 2270/402; B60T 2270/82; B60T 13/62
See application file for complete search history.

(56) References Cited

U.S. PATENT DOCUMENTS

| | | | |
|---|---|---|---|
| 6,164,183 A * | 12/2000 | Fulks | B60T 8/4854 91/367 |
| 8,136,892 B2 * | 3/2012 | Lacroix | B60T 13/52 303/113.4 |
| 9,889,836 B2 * | 2/2018 | Mahnkopf | B60T 13/745 |

(Continued)

FOREIGN PATENT DOCUMENTS

| | | |
|---|---|---|
| DE | 102013208672 A1 | 11/2014 |
| DE | 102014007004 A1 | 11/2014 |

(Continued)

*Primary Examiner* — Pamela Rodriguez
(74) *Attorney, Agent, or Firm* — Robert James Harwood (57) ABSTRACT

A brake booster is comprised of an actuation unit, which can be coupled to a brake cylinder. The actuation unit is comprised of at least one actuation element that can be coupled to an electric motor via a transmission and at least one actuation element that can be coupled to a power input element. The actuation unit also includes at least one power transmission element that can be coupled to at least one actuation element in a power-transmitting manner, and at least one power take-up element that can be coupled or is coupled to an actuation detection device for the detection of an actuation of the electromechanical brake booster. The power take-up element can be coupled or is coupled to at least one actuation element. The power take-up element is configured to limit a relative movement of the actuation element relative to the power transmission element.

18 Claims, 5 Drawing Sheets

(56) References Cited

U.S. PATENT DOCUMENTS

| | | | |
|---|---|---|---|
| 10,286,888 B2* | 5/2019 | Calvo Martinez | B60T 15/10 |
| 10,946,845 B2* | 3/2021 | Wingender | B60T 13/745 |
| 2011/0074209 A1* | 3/2011 | Ueno | B60T 13/745 |
| | | | 303/20 |
| 2011/0248557 A1* | 10/2011 | Overzier | B60T 11/18 |
| | | | 303/3 |
| 2012/0102940 A1* | 5/2012 | Ueno | B60T 8/441 |
| | | | 60/537 |
| 2013/0298550 A1* | 11/2013 | Leiber | B60T 13/686 |
| | | | 60/545 |
| 2014/0331758 A1* | 11/2014 | Sim | G01L 5/28 |
| | | | 73/132 |

FOREIGN PATENT DOCUMENTS

| | | |
|---|---|---|
| DE | 102015213569 A1 | 1/2017 |
| DE | 102016202575 A1 | 8/2017 |
| EP | 1972516 A2 | 9/2008 |

\* cited by examiner

ELECTROMECHANICAL BRAKE BOOSTER, VEHICLE BRAKE SYSTEM AND ASSEMBLY FOR THIS

CROSS-REFERENCE TO RELATED APPLICATIONS

This application claims priority to German patent application 102018006237.7, filed Aug. 7, 2018, the disclosure of which is incorporated herein by reference in its entirety.

TECHNICAL FIELD

The present disclosure relates to the field of electrohydraulic braking pressure generation in general, and in particular, to an electromechanical brake booster, which can be used in a device for electrohydraulic braking pressure generation.

BACKGROUND

Electromechanical brake boosters are powered by electric motors. To be able to generate boosting the brake power with the brake booster, the rotational movement of the output shaft of the electric motor must be converted to a translatory movement. Aside from electromechanically powered brake boosters, pneumatically powered brake boosters are also known from the prior art.

In the printed publication DE 10 2016 202 575 A1, a brake booster is disclosed showing an electric motor. A braking device is comprised of an actuating mechanism loadable with power by the brake booster. The electric motor is coupled to the actuating mechanism in a driving manner via a transmission. The transmission is designed to convert the rotational movement of the electric motor to a translatory movement of the actuating mechanism. The actuating path of the actuating mechanism is determined by the signal of an engine position sensor of the electric motor. Use is here made of the fact that the position of the electric motor is linked to the position of the actuating mechanism via the gear ratio of the transmission.

In the printed publication DE 10 2014 007 004 A1, a pedal path sensor is disclosed, which detects a shift of a movable element coupled to a brake pedal. In the printed publication DE 10 2015 213 569 A1, a brake master cylinder coupled to a signal generator is described. A sensor receives the signal of the signal generator to detect a shift of the brake master cylinder. In the printed publication EP 1 972 516 A1, a sensor is also disclosed for detecting the actuation of the brake master cylinder.

The devices known from the prior art have a relatively complex assembly with a large number of individual parts.

SUMMARY

An electromechanical brake booster of the present disclosure includes a simplified assembly which can be produced at low cost. Thus, the electromechanical brake booster for a vehicle brake system introduced here is comprised of an actuation unit, which can be coupled to a brake cylinder. The actuation unit is comprised of at least one actuation element that can be coupled to an electric motor via a transmission and at least one actuation element that can be coupled to a power input element. The actuation unit is also comprised of at least a power transmission element that can be coupled to at least one actuation element in a power-transmitting manner, and at least a power take-up element that can be coupled or is coupled to an actuation detection device for the detection of an actuation of the actuation element actuation member of an electromechanical brake booster. The power take-up element can be coupled or is coupled to at least one actuation element. The power take-up element is also configured to limit a relative movement of the actuation element relative to the power transmission element.

The power transmission element can show at least one contact surface. The at least one actuation element can abut, at least in sections, against the at least one contact surface for the transmission of a power exerted on the actuation element to the power transmission element. For example, the actuation element can abut against the power transmission element, if the actuation power provided by the electric motor is not sufficient anymore to generate the brake power required by the driver by means of the brake pedal. In this case, at least part of the brake power required by the driver can be directly transmitted to the power transmission element via the actuation element. Even if the electric motor or transmission is defective, the actuation power exerted on the brake pedal by the driver can be transmitted to the power transmission element via the actuation element and then fed to the brake cylinder. The at least one actuation element can provide a mechanical coupling to the power transmission element when abutting against the contact surface.

In addition, or alternatively to the contact surface, the at least one power transmission element can show at least one abutment surface. The at least one power take-up element can abut against the abutment surface in the un-actuated state of the actuation unit. Die abutment surface can define a rest or starting position of the actuation element relative to the power transmission element. With the abutment surface, a rest or starting position of the power input element coupled to the actuation element can be specified.

The actuation element can be preloaded in a starting position via at least one return spring. The return spring can preload the power take-up element coupled to the actuation element in abutment against the abutment surface. The at least one return spring can extend between the actuation element and the power transmission element. The at least one return spring can rest on the actuation element and the power transmission element. For this purpose, corresponding projections or ledges can be provided on the actuation element and the power transmission element.

The at least one power transmission element can show at least one opening, through which or in which the at least one power take-up element can extend. The power take-up element can be coupled to the actuation element in the opening of the power transmission element. The abutment surface can be configured in the area of the (for example, in the) at least one opening of the power transmission element. The abutment surface can be configured on one wall of the opening. The contact surface and/or abutment surface can extend essentially vertically to a longitudinal axis of the actuation unit. The longitudinal axis of the actuation unit usually corresponds with the actuation axis of the brake booster. The contact surface and the abutment surface can extend parallel to each other.

The power take-up element can show a power take-up section abutting against the at least one actuation element. The actuation element can show a groove or indentation, in which the power take-up section of the power take-up element can engage. For example, the actuation element can show a circumferential groove. The power take-up element can abut against the actuation element free of play. The power take-up element can move in the direction of the longitudinal axis of the actuation unit together with the actuation element.

The power take-up section can be configured fork-shaped or clip-shaped. The power take-up section can engage around at least one section of the actuation element. The power take-up section can show two shanks defining one take-up for the actuation element. Both shanks can be configured so that they can be fitted to the at least one actuation element. Both shanks can show a space between each other in at least one section, which is suitable for including a section of the actuation element.

In a variant, the space of both shanks is configured corresponding to the extension or the diameter of the section of the actuation element, which is supposed to be inserted between both shanks. In other words, the space between both shanks can be adjusted to the diameter of the actuation element in the area of the groove or the indentation. In a variant, the space of both shanks can be smaller than the extension or the diameter of the section of the actuation element, which is supposed to be inserted in the power take-up section. The power take-up section can be elastically deformable to allow for the fitting of the power take-up element on the actuation element. During the fitting of the power take-up element to the actuation element, both shanks can expand until the actuation element has reached the section of the power take-up section, which is supposed to receive the actuation element. As soon as the actuation element has reached the section of the power take-up section for insertion, both shanks can move back to their starting position and hold the power take-up element on the actuation element. The space of both shanks can be so large that the corresponding section of the actuation element can be inserted in the power take-up section free of play. Each shank can show a curved or arched section, whose radius of curvature is adjusted to the extension or the diameter of the section of the section of the actuation element, which is supposed to be inserted between the shanks of the power take-up section.

The power take-up section can extend perpendicularly to the longitudinal axis of the actuation unit. The power take-up section can show a counter-abutment surface. The counter-abutment surface can be configured to contact the abutment surface of the power transmission element. The counter-abutment surface can extend vertically to the longitudinal axis of the actuation unit. The counter-abutment surface can rest in sections on the side walls of the groove or the indentation in the actuation element. The side walls of the groove or the indentation essentially extend vertically to the longitudinal axis of the actuation element or the actuation unit.

The actuation element can show at least one counter-contact surface. The counter-contact surface can be configured to contact the contact surface of the power transmission element. The counter-contact surface can be provided at the protrusion of the actuation element. The protrusion can extend in a radial direction. For example, the protrusion is configured circumferentially on the actuation element. The contact surface and the counter-contact surface can be opposite from each other or facing each other. The contact surface and the counter-contact surface can essentially extend parallel to each other.

The contact surface and the counter-contact surface can extend in a radial direction. The contact surface and the counter-contact surface can show a space in the axial direction to each other. This space between the contact surface and the counter-contact surface in the direction of the longitudinal axis of the actuation unit can specify the maximum allowable path of a relative movement of the actuation element relative to the power transmission element. If this space between the contact surface and the counter-contact surface is removed, the actuation element establishes a mechanical coupling with the power transmission element.

The power transmission element can show a contact shoulder, to which the contact surface is configured. The contact shoulder can extend in a radial direction. The contact shoulder can be configured in an opening of the power transmission element, where the actuation element is extending in sections or where the actuation element is inserted in sections. The contact shoulder can form a ledge in the opening of the power transmission element. The actuation element can show a protrusion, to which the counter-contact surface is configured. The protrusion can extend in a radial direction and circumferentially configured on the actuation element.

The power take-up element can show a detection section that can be coupled or is coupled to the actuation detection device. The detection section can essentially extend vertically to the longitudinal axis of the actuation unit. The detection section can have an opening. The opening can be design for coupling of the power take-up element to the actuation detection device. In the opening of the detection section, a sliding element of the actuation detection device can engage so that the shift of the power transmission element detects in the direction of the longitudinal axis of the actuation unit.

The power take-up section can be connected with the detection section via a connection section. The connection section can essentially extend parallel to the longitudinal axis of the actuation unit. Particularly, the connection section can extend in a radial direction between the actuation element and the power transmission element. The connection section can essentially extend vertically to the detection section and the power take-up section. The power take-up section and the detection section can extend in the opposite direction away from the connection section.

The actuation element can show at least one opening, through which the at least one power take-up element extends. For example, the detection section of the power take-up element can extend through the opening of the actuation element. The detection section can extend through the opening of the actuation element in the direction of the actuation detection device. The actuation element can receive the at least one power transmission element.

The at least one power transmission element can receive the at least one actuation element. The power transmission element can be slidable in the direction of the longitudinal axis der actuation unit. The at least one power take-up element can show a take-up for a rubber-elastic reaction disc. The rubber-elastic reaction disc can rest on an abutment surface of the power transmission element. The actuation element can be designed in form of a piston and slidable inserted in the power transmission element relative to the power transmission element. The actuation element can rest on the power transmission element via a spring.

The actuation element can show an indentation. The power input element can show a spherical end section. The indentation of the actuation element and the spherical end section of the power input element can form a joint, through which the power input element relative to the actuation element is displaceable. The power input element can protrude into the passenger compartment of a vehicle. Inside the passenger compartment of the vehicle, the power input element can be coupled to a brake pedal in a rigid manner to transmit the actuation power generated by the driver of the vehicle to the actuation element.

The at least one power transmission element can show at least one contact protrusion. The at least one actuation element can be abutted against the at least one contact protrusion. In other words, the at least one actuation element can rest on the contact protrusion of the power transmission element to be able to transmit the boosting power provided by the electric motor and the transmission to the power transmission element via this contact.

The at least one actuation element can show at least one rack section, which can be coupled to the electric motor via a transmission. The transmission can be a transmission with spur gears that is powered by an electric motor and coupled to the at least one rack section. With the help of the rack section, the rotational movement generated by the electric motor can be converted into a translatory movement of the at least one actuation element. The at least one actuation element can show two or several rack sections, which each can be engaged with a gear wheel or a spur wheel of a transmission.

An assembly for a vehicle brake system is also specified. The assembly shows the type of brake booster described here and a brake cylinder, which can be coupled to at least one brake circuit of the vehicle brake system in a fluidic way. The brake booster can be coupled to the brake cylinder in a power-transmitting manner and serves for the actuation of the brake cylinder.

The brake cylinder can be mounted to the housing of the brake booster. The brake cylinder can show at least one pressure piston, which is inserted slidable into at least one pressure chamber. At least one brake circuit of the vehicle brake system can be pressurized with hydraulic brake pressure via the pressure piston. The pressure piston can be pressurized boosting power of the brake booster as well as with the actuation power generated by the driver to generate the desired brake pressure at the wheel brakes connected with the brake cylinder. A vehicle brake system with the assembly described above or the type of brake booster described here is also specified.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1:
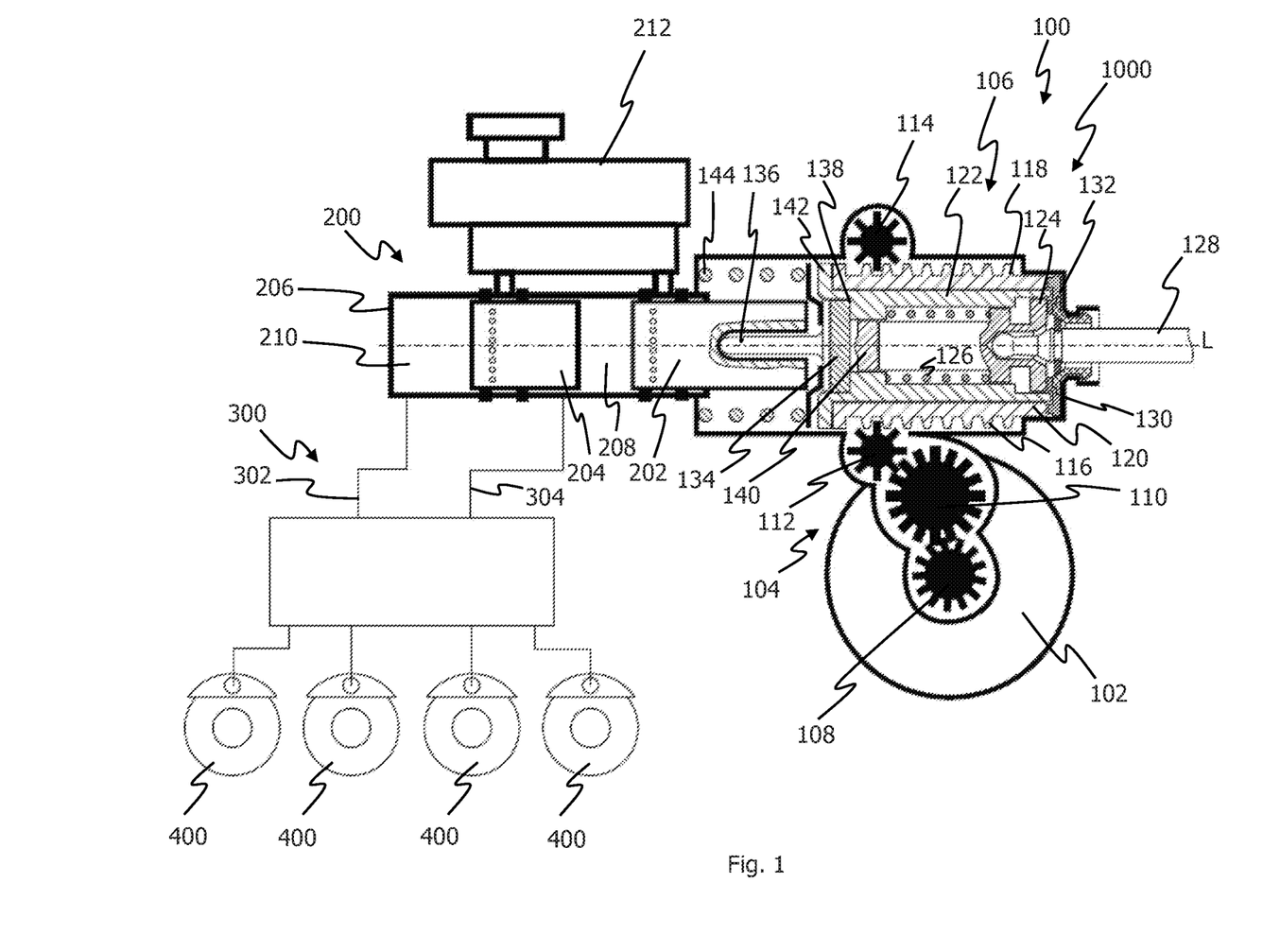
FIG. 1 a schematic view of a vehicle brake system with a brake booster in accordance with an exemplary embodiment.

FIG. 1 shows a view of an exemplary embodiment of a vehicle brake system 1000. The vehicle brake system 1000 shows a brake booster 100, a brake cylinder 200, brake circuits 300, and wheel brakes 400 connected with the brake circuits 300 auf. The brake cylinder 200 can be a brake master cylinder of the vehicle brake system 1000.

The brake booster 100 is comprised of an electric motor 102, a transmission 104, and an actuation unit 106. The electric motor 102 shows an output gear wheel 108, which is coupled to the spur wheels 112 and 114 via an idle wheel 110 and additional spur wheels or transmission components. The spur wheels 112 and 114 are coupled to the actuation unit 106 of the brake booster 100. The spur wheels 112 and 114 are engaged with rack sections 116 and 118 of an actuation element 120 of the actuation unit 106. The actuation element 120 receives a power transmission element 122 in sections. In the power transmission element 122, an actuation element 124 is displaceably inserted in the direction of the longitudinal axis L. The actuation element 124 bears on the power transmission element 122 via a return spring 126.

The actuation element 124 is coupled to a power input element 128 in a jointed manner. The power input element 128 can protrude into the passenger compartment with the brake booster 100 attached to the vehicle (not shown). Inside the passenger compartment of the vehicle, the power input element 128 can be coupled to a brake pedal assembly in a rigid manner. The power input element 128 can transmit the actuation power generated on the brake pedal by the driver to the actuation unit 106 of the brake booster 100. The power input element 128 transmits the actuation power of the driver to the actuation element 124, which is pushed to the left under compression of the return spring 126 in FIG. 1 to be able to transmit the actuation power generated by the driver to the brake master cylinder 200.

The brake booster 100 shows a housing 130, in which is at least the actuation unit 106 is inserted. Between the actuation element 120 and the housing 130, an attentuator 132 is installed. The attentuator 132 absorbs the impact of the actuation element 118 at the housing 130, when the actuation unit 106 moves back. The absorbing effect of the attentuator 132 can prevent undesired vibrations and particularly noises (like impact noises), which can occur, when the actuation element 120 hits the housing 130.

The actuation unit 106 shows also a rubber-elastic reaction disc 134, which is connected to a power introduction element 136. The reaction disc 134 is inserted in the power transmission element 122 and rests on a surface 138 vertically to the longitudinal axis L of the power transmission element 122. At the actuation element 124, an end element 140 is shown, which is configured to act on the reaction disc when the brake booster 100 is actuated. The power introduction element 136 shows a pin-shaped section. This pin-shaped section is partially inserted into a pressure piston 202 of the brake master cylinder 200. Aside from the pressure piston 202, the brake master cylinder 200 shows an additional pressure piston 204. The pressure pistons 202 and 204 specify pressure chambers 208 and 210 filled with hydraulic fluid in the housing 206 of the brake master cylinder 202. The brake master cylinder 200 is supplied with brake fluid from a container 212. The pressure chambers 208 and 210 in the brake master cylinder 200 are each connected with a brake circuit 302 and 304. Two wheel brakes 400 at a time can be supplied with hydraulic brake pressure by the brake circuits 302 and 304 for performing a brake action.

Figure 2:
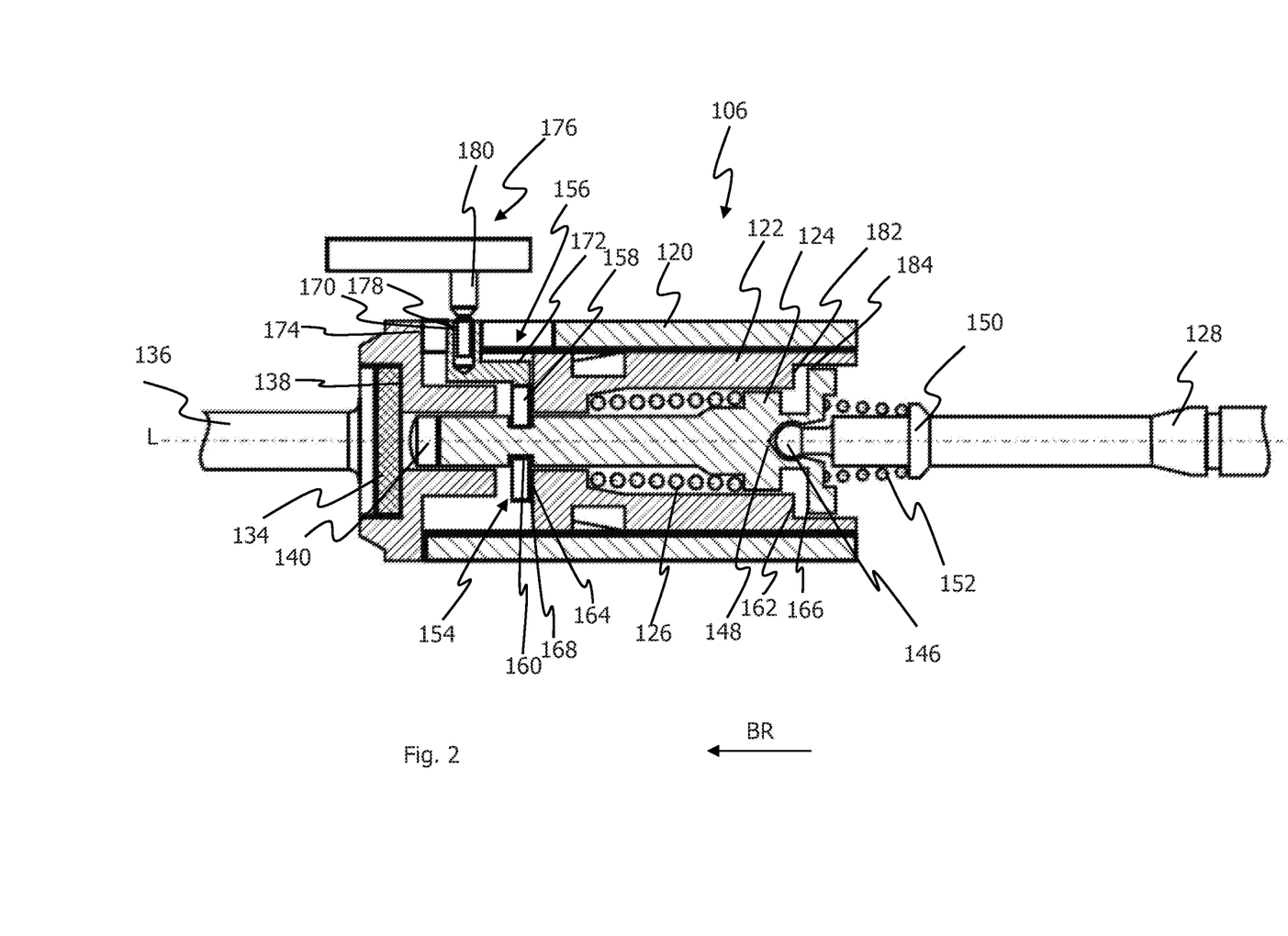
FIG. 2 an enlarged schematic view of an actuation unit of the brake booster in accordance with FIG. 1 in un-actuated state.

FIG. 2 shows an enlarged schematic view of the actuation unit 106 in un-actuated state. The power input element 128 shows a spherical end section 146, which is inserted in an indentation 148 of the actuation element 124. The spherical section 146 and the indentation 148 are forming a joint so that a deflection of the power input element 128 relative to the actuation element 124 is possible. The power input element 128 shows a protrusion 150, on which a spring 152 with one end is supported. With its other end, the spring 152 is supported by the actuation element 124. The spring 152 can keep the power input element in an assembly position. The Feder 152 is conically configured and expands in the direction of the actuation element 124.

In the power transmission element 122, the actuation element 124 is displaceably inserted in the direction of the longitudinal axis L. The return spring 126 extends between the actuation element 124 and the power transmission element 122, i.e. the return spring 126 bears on the power transmission element 122 and the actuation element 124. When the return spring 126 is compressed, the actuation element 124 can be shifted relative to the power transmission element 122.

The power transmission element 122 has an opening 154. The opening 154 extends in sections perpendicularly to the longitudinal axis L. The opening 154 extends from the outer periphery of the power transmission element 122 to a central receiving opening in the power transmission element 122, into which the actuation element 124 is displaceably inserted. In the opening 154, a power take-up element 156 is installed. The power take-up element 156 is coupled to the actuation element 124. The power take-up element 156 is coupled to the actuation element 124 in such a way that the power take-up element 156 can be moved along the longitudinal axis L by the actuation element 124. The power take-up element 156 connected with the actuation element 124 free of play. The power take-up element 156 shows a power take-up section 158, which is engaged with the actuation element 124. The power take-up section 158 of the power take-up element 156 engages in a groove 160 of the actuation element 124. The power take-up section 158 essentially extends vertically to the longitudinal axis L of the actuation unit 106.

The power transmission element 122 shows a contact surface 162 and an abutment surface 164. The contact surface 162 is configured at the right end section of the power transmission element 122 in FIG. 2. The abutment surface 164 is configured in the opening 154 of the power transmission element 122. The contact surface 162 and the abutment surface 164 essentially extend vertically to the longitudinal axis L of the actuation unit 106. The contact surface 162 and the abutment surface 164 extend in a radial direction. The contact surface 162 and the abutment surface 164 point in opposite directions and essentially extend parallel to each other.

The actuation element 124 can attach to the contact surface 162 to transmit a power exerted on the actuation element 124 to the power transmission element 122. For this purpose, the actuation element 124 shows a counter-contact surface 166, with which the actuation element 124 can attach to the contact surface 162. The counter-contact surface 166 extends in a radial direction and essentially parallel to the contact surface 162. The contact surface 162 and the counter-contact surface 166 are facing each other. Between der contact surface 162 of the power transmission element 122 and the counter-contact surface 166 of the actuation element 124, a space aligns itself in the starting position in the direction of the longitudinal axis L. This space specifies the maximum allowed path of a relative movement between the actuation element 124 and the power transmission element 122. The relative movement between the actuation element 124 and the power transmission element 122 is limited by the contact of the contact surface 162 and the counter-contact surface 166 to each other. This contact of the contact surface 162 and the counter-contact surface 166 to each other limits a relative movement of the actuation element 124 and the power transmission element 122 in the actuation direction of the actuation unit 106, which is indicated by the arrow BR in FIG. 2.

The power take-up element 156 can also limit a relative movement between the actuation element 124 and the power transmission element 122 by bumping against the abutment surface 164 of the power transmission element 122. At the power take-up section 158 of the power take-up element 156, a counter-abutment surface 168 is configured. The counter-abutment surface 168 is facing the abutment surface 164 and can attach to the abutment surface 164. The contact surface 164 and the counter-abutment surface 168 essentially extend parallel to each other. By attaching the counter-abutment surface 168 of the power take-up element 156 to the abutment surface 164, a relative movement occurring during a reset event between the actuation element 124 and the power transmission element 122 can be limited. This reset event is triggered by the return spring 126, if the actuation unit 106 is not actuated anymore. The return spring 126 preloads the actuation element 124 in the contact an der abutment surface 164. By attaching the counter-abutment surface 168 to the abutment surface 164, a relative movement between the actuation element 124 and the power transmission element 122 is consequently limited in one of the directions opposite to the actuation direction BR.

The power take-up element 156 also shows a detection section 170. The detection section 170 is connected with the power take-up section 158 via a connection section 172. Like the power take-up section 158, the detection section 170 essentially extends vertically to the longitudinal axis L of the actuation unit 106. The connection section 172 essentially extends between the power take-up section 158 and the detection section 170 parallel to the longitudinal axis L of the actuation unit 106. The power take-up element 156 is an integrally configured element, i.e. the power take-up section 158, the detection section 170 and the connection section 172 are integrally configured. The power take-up element 156 is coupled to the actuation detection device 176 via the detection section 170. The detection section 170 extends through an opening 174 in the actuation element 120 in the direction of the actuation detection device 176. For coupling to the actuation detection device 176, the detection section 170 shows an opening 178, into which a movable element 180 of the actuation detection device 176 engages.

In FIG. 2, the actuation element 124 is shown in rest or starting position. The abutment surface 164 specifies a defined rest or starting position of the actuation element 124. In the starting position, the counter-abutment surface 168 of the power take-up element 156 and the abutment surface 164 attach to each other. Since the actuation element 124 is coupled to the power input element 128 in a power-transmitting manner, a defined rest or starting position of the power input element 128 is also specified about the attachment of the power take-up element 156 to the second abutment surface 164. The return spring 126 preloads the actuation element 124 in the starting position. In other words, the return spring 126 preloads the power take-up element 156 towards the abutment surface 164 of the power transmission element 122.

In the starting position shown in FIG. 2, a space between the contact surface 162 of the power transmission element 122 and the counter-contact surface 166 of the actuation element 124 occurs. The contact surface 162 is configured at a contact shoulder or a circumferential ledge 182 of the power transmission element 122. The counter-contact surface 166 is configured at a circumferential protrusion 184 extending in a radial direction at the actuation element 124. The contact shoulder 182 and the circumferential protrusion 184 are located at the right end of the power transmission element 122 and the actuation element 124 in FIG. 2. The contact surface 162 and the counter-contact surface 166 are facing each other. The contact surface 162 and the counter-contact surface 166 can attach each other with an appropriately high actuation power and a resulting compression of the return spring 126. In case of failure of the electric motor 102 and consequently of the brake assistance, the brake cylinder 200 in front and consequently the brake can still be actuated with muscle strength of the driver with this system (push through). The spring 152 also rests on the protrusion 184, which keeps the power input element 128 in an assembly position. The spring 152 rests on the surface of the protrusion 184 opposite to the counter-contact surface 166.

Figure 3:
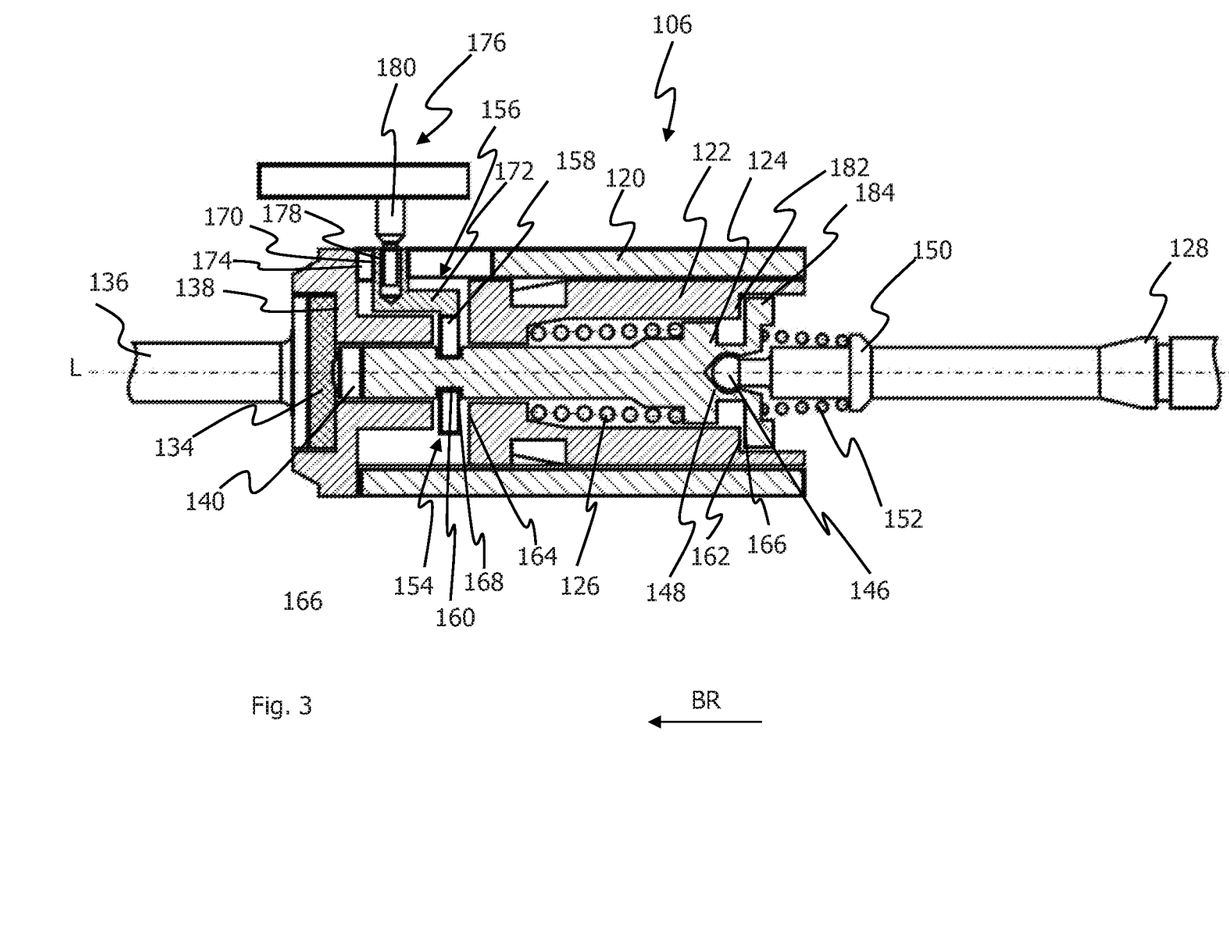
FIG. 3 an enlarged schematic view of the actuation unit of the brake booster in accordance with FIG. 1 in actuated state.

FIG. 3 shows an enlarged schematic view of the actuation unit 106 in actuated state. The actuated state of the actuation unit 106 is apparent when the power take-up element 156 does not rest on the abutment surface 164 of the power transmission element 122 anymore. In FIG. 3, the counter-abutment surface 168 was lifted from the abutment surface 164 so that the space between both of the surfaces 164 and 168 is shown. In addition, the axial spacing of the contact surface 162 of the power transmission element 122 and the counter-contact surface 166 of the actuation element 124 clearly decreased compared to the axial spacing in the starting position in accordance with FIG. 2. This also shows the actuation of the actuation unit 106.

Figure 4:
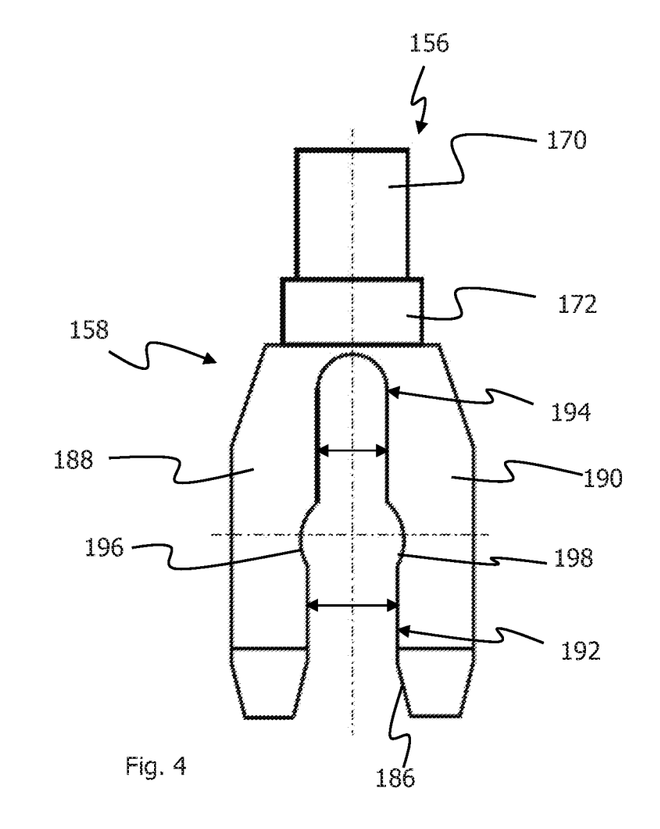
FIG. 4 a front view of a power take-up element.

FIG. 4 shows a front view of the power take-up element 156. The power take-up element 156 shows the power take-up section 158, the detection section 170 and the connection section 172, which connects the detection section 170 with the power take-up section 158. The power take-up section 158 has an indentation 186. The indentation 186 divides the power take-up section 158 in two shanks 188 und 190. Both shanks 188 and 190 configure a take-up for the actuation element 124 between each other, Both shanks 188 and 190 specify between each other a first space A1 in a section 192 and a second space A2 in a second section 194, whereby the space A1 is larger than the space A2.

Each shank 188, 190 shows a section 196, 198, which is configured curved or arched. The two arched or curved sections 196 and 198 show the same radius of curvature and are opposite to each other. The two arched or curved sections 196 und 198 are each installed between the two sections 192 und 194 of the shanks 188 and 190.

The two curved sections 196 und 198 are configured to receive the section of the actuation element 124 with the groove 160. The groove 160 decreases the diameter of the actuation element 124 so that the curved sections 196 and 198 of the shanks 188 and 190 can receive the section of the actuation element 124 with the groove 160 between each other. The diameter of the actuation element 124 enclosable between the curved sections 196 and 198 is smaller than the diameter of the actuation element 124 outside of the groove 160. The power take-up element 156 with the groove 160 of the actuation element 124 is engaged with the curved sections 196 and 198. The space A1 between the shanks 188 and 190 in the section 192 is so large that a fitting of the power take-up element 156 on the actuation element 124 is possible. The power take-up section 158 can be elastically deformable, so that the space between the shanks 188 and 190 initially expands when fitting the power take-up element on the actuation element 124, until the actuation element 124 reaches the curved sections 196 and 198 of the shanks 188 and 190.

After the actuation element 124 has reached the curved sections 196 and 198, the shanks 188 and 190 move or spring back into their starting position, so that the actuation element 124 is securely inserted between the shanks 188 and 190. Due to its minimal extension, the space A2 in the section 194 can ensure that the power take-up element 156 can only be fitted on the actuation element up to the curved sections 196 and 198. The section 194 consequently ensures that the power take-up element 156 is correctly positioned on the actuation element 124.

Figure 5:
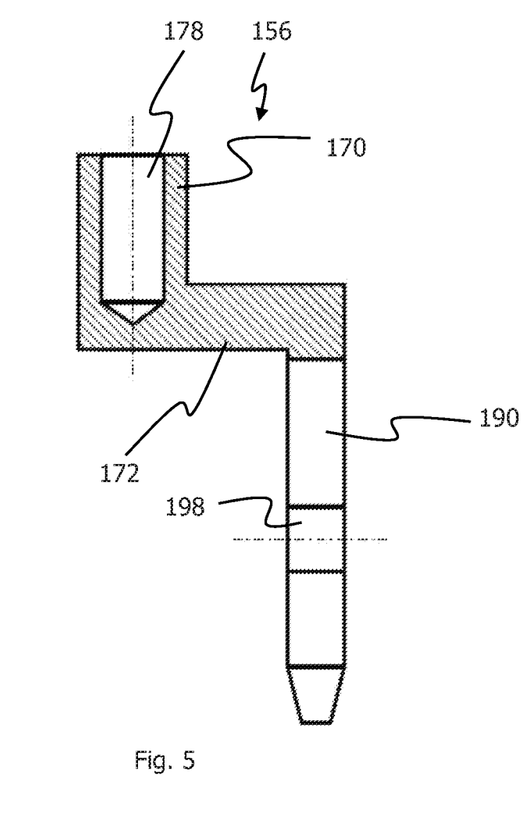
FIG. 5 a sectional view of the power take-up element in accordance with FIG. 4.

FIG. 5 shows a sectional view of the power take-up element 156 showing the angled body of the power take-up element 156. The power take-up section 158 and the detection section 170 extend parallel to each other, but in the opposite direction away from the connection section 172. In the sectional view in accordance with FIG. 5, the opening 178 can be seen in the detection section 170. The opening 178 is used for coupling the power take-up element 156 to the actuation detection device 176 (see FIGS. 2 and 3).

Below, the function of the brake booster 100 and the vehicle brake system 1000 is explained. FIG. 2 shows the actuation unit 106 in un-actuated state. The actuation element 124 and the power input element 128 are in their starting position, where the power take-up element 156 connected to the actuation element 124 rests on the abutment surface 164 of the power transmission element 122.

The actuation of the brake booster 100 and consequently of the assembly consisting of brake booster 100 and brake cylinder 200 is performed by the driver of the vehicle. The driver of the vehicle actuates the brake pedal (not shown) in the interior of the vehicle and the actuation power applied to the brake pedal by the driver is initiated by the power input element 128 in the brake booster 100. With the actuation of the brake pedal, the power input element 128 and the actuation element 124 coupled to the power input element 128 from the starting position shown in FIG. 2 are moved under compression of the return spring 126 in the actuation direction indicated by the arrow BR, i.e. in FIGS. 1 bis 3 to the left, whereby the end element 140 of the actuation element 124 penetrates the rubber-elastic reaction disc 134. The power take-up element 156 tightly coupled to the actuation element 124 is lifted from the second abutment surface 164 by the movement of the actuation element 124 and moves together with the actuation element 124 in the actuation direction BR. This actuation state is in FIG. 3 shown. The detection section 170 of the power take-up element 156 takes along the movable element 180 der actuation detection device 176, whereby the actuation of the actuation element 124 can be detected with the actuation detection device 176 detects. The actuation detection device 176 generates electronically usable signals based on the shifting of the movable element 180, which is transmitted to a control unit (not shown). With these electronic signals, the electronic control unit calculates the brake power required by the driver.

Based on the actuating path generated by the driver on the brake pedal and detected by the actuation detection device 176, the boosting power needed to be generated by the electric motor 102 and the transmission 104 can be calculated. The boosting power is generated by the electric motor 102 and the transmission 104 and transmitted from the transmission 102 to the actuation element 120 of the actuation unit 106 transmit. The rack sections 116 and 118 of the actuation element 120 are powered via the spur wheels 112 and 114 of the transmission 104. The actuation element 120 rests on the contact protrusion 142 of the power transmission element 122 with its front face facing away from the attentuator 132 (see FIG. 1).

The actuation element 120 can move the power transmission element 122 with an actuation of the brake booster 100 in FIG. 1 along the longitudinal axis L to the left. With an actuation of the brake booster 100, the power transmission element 122 with the surface 138 and the front face of the end element 140 of the actuation element 124 affect the rubber-elastic reaction disc 134. The resulting power from the total of the actuation power generated by the driver and the boosting power generated by the electric motor 102 and the transmission 106 is transmitted to the brake master cylinder 200 by the reaction disc 134 and the power introduction element 136 attached to it. With the actuation power and the boosting power, the spring 144 is compressed and the pressure piston 202 of the brake master cylinder 200 is moved in the direction of the longitudinal axis L to the left, whereby the second pressure piston 204 also moves to the left. Consequently, a hydraulic brake pressure is generated in the pressure chambers 208 and 210. The brake pressure generated in the pressure chambers 208 and 210 is transmitted to the wheel brake 400 via the brake circuits 302 and 304 to perform the brake action (see FIG. 1).

As long as the boosting power generally by the electric motor 102 and the transmission 104 is high enough, the power transmission element 122 will be moved further in the actuation direction BR by the actuation element 120 to continue actuating the brake cylinder 120. The actuation element 128 is moved by the actuation power of the driver. The power transmission element 122 and the actuation element 124 with the power transmission element 156 move synchronously in the actuation direction BR in this case. During this synchronous movement, the state of the state of the actuation unit 106 shown in FIG. 3 is essentially maintained. The counter-contact surface 166 of the actuation element 124 does not get into contact with the contact surface 162 of the power transmission element 122. The actuation power transmitted from the brake pedal to the power input element 128 and in this way also to the actuation element 124 exceeds the boosting power generated by the electric motor 102 and the transmission in this case.

If the boosting power generated by the electric motor 102 and the transmission 104 is not sufficient, the return spring 126 will be compressed by the actuation element 142, until the counter-contact surface 166 of the actuation element 124 rests on the contact surface 162 of the power transmission element 122. The actuation element 124 then establishes a mechanical coupling with the power transmission element 122. For this purpose, there will be a relative movement between the actuation element 124 and the power transmission element 122 while compressing the return spring 126, until the counter-contact surface 166 rests on the contact surface 162. Due to this contact, the relative movement is limited between the actuation element 124 and the power transmission element 122. The actuation power generated by the driver on the brake pedal is then mechanically transmitted via the power input element 128, the actuation element 124, the power take-up element 158, and the power take-up element 156 directly to the power transmission element 122 and consequently directly to the brake cylinder 200 to generate the brake power required by the driver. Even in case of a defect in the electric motor 102 and/or the transmission 104, the actuation power generated by the driver can be directly mechanically transmitted from the actuation element 124 to the power transmission element 122 to introduce the actuation power generated by the driver to the brake cylinder 200. In both cases, the actuation power of the driver is transmitted from the power input element 128 and the actuation element 124 to the power transmission element 122. The power transmission element 122 transmits the actuation power via the reaction disc 134 to the power introduction element 136, which introduces the actuation power to the brake cylinder 200 (see FIG. 1).

After a brake action, the actuation unit 106 in FIG. 1 is moved along the longitudinal axis L to the right. The actuation element 124, the power input element 156 installed at the actuation element 124, and the power input element 128 are returned by the return spring 126 to their starting position, where the power take-up element 156 rests on the abutment surface 164 of the power transmission element 122. The abutment surface 164 specifies a defined rest or starting position of the actuation element 124 and the power input element 128. This defined starting position of the actuation element 124 and the power input element 128 is shown in FIG. 2. The power take-up element 156 can consequently limit a relative movement between the actuation element 128 and the power transmission element 122.

To prevent impact noises of the actuation unit 106 at the housing 130 of the brake booster 100 during the return movement, the attentuator 132 is provided. The attentuator 132 is installed in the direction of the longitudinal axis L between the actuation unit 106 and particularly the actuation element 108 and the housing 130. The attentuator 132 essentially extends vertically to the longitudinal axis L of the brake booster 100. With the attentuator 132, impact noises of the actuation element 108 at the housing 130 can be absorbed, since the actuation element 108 does not bump directly at the housing 130 anymore (see FIG. 1).

With the integral power take-up element 156, which limits the relative movement between the actuation element 124 and the power transmission element 122 and is concurrently coupled to the actuation detection device 176 for the detection of the actuation of the brake booster 100, the assembly of the brake booster 100 can be simplified. The brake booster 100 shows few parts. Consequently, the brake booster 100 can be produced cost-effective and is easy to install.

What is claimed is:

1. A brake booster for a vehicle brake system with an actuation unit, which can be coupled to a brake cylinder wherein the actuation unit shows:
   at least one first actuation element that can be coupled to an electric motor via a transmission;
   at least one second actuation element that can be coupled to a power input element;
   at least one power transmission element that can be coupled to the at least one second actuation element in a power-transmitting manner; and
   at least one power take-up element that can be coupled or is coupled to an actuation detection device for the detection of an actuation of the brake booster wherein the power take-up element is connected to and movable with the at least one second actuation element during brake booster actuation wherein the power take-up element is configured to limit a relative movement of the at least one second actuation element relative to the power transmission element.

2. The brake booster as defined by claim 1 wherein the power transmission element includes at least one contact surface, at which the at least one second actuation element rests for the transmission of a power exerted on the at least one second actuation element to the power transmission element.

3. The brake booster as defined by claim 2 wherein the contact surface extends vertically to the longitudinal axis of the actuation unit.

4. The brake booster as defined by claim 2 wherein the at least one second actuation element shows at least one counter-contact surface, which is configured to rest on the contact surface of the power transmission element.

5. The brake booster as defined by claim 1 wherein the power transmission element shows at least one abutment surface, at which the at least one power take-up element rests in an un-actuated state of the actuation unit.

6. The brake booster as defined by claim 5 wherein the at least one power transmission element shows at one opening, through which or in which the at least one power take-up element extends.

7. The brake booster as defined by claim 6 wherein the abutment surface is configured in the area of the at least one opening of the power transmission element.

8. The brake booster as defined by claim 5 wherein the power take-up element shows a power take-up section engaging with the at least one second actuation element.

9. The brake booster as defined by claim 8 wherein the power take-up section is configured fork-shaped or clamp-shaped and engages at least one section of the at least one second actuation element.

10. The brake booster as defined by claim 8 wherein the power take-up section extends perpendicularly to the longitudinal axis of the actuation unit.

11. The brake booster as defined by claim 8 wherein the power take-up section shows a counter-abutment surface, which is configured to rest on the abutment surface of the power transmission element.

12. The brake booster as defined by claim 5 wherein the abutment surface extends transverse to the longitudinal axis of the actuation unit.

13. The brake booster as defined by claim 1 wherein at least one return spring is provided, which preloads the at least one second actuation element in a starting position.

14. The brake booster as defined by claim 1 wherein the power take-up element shows a detection section that can be coupled or is coupled to the actuation detection device.

15. The brake booster as defined by claim 1 wherein the power take-up element has a first end connected to and movable with the at least one second actuation element and a second end extending to the actuation detection device such that the actuation detection device tracks movement of the power take-up element to thereby track axial movement of the at least one second actuation element.

16. The brake booster as defined by claim 1 wherein the power take-up element extends through a radially extending opening in the power transmission element and connects to the at least one second actuation element for axial movement therewith within the opening.

17. A brake booster for a vehicle brake system with an actuation unit, which can be coupled to a brake cylinder wherein the actuation unit shows:
   a first actuation element configured for coupling to an electric motor;
   a second actuation element axially movable by a power input element;
   a power transmission element connected to the second actuation element in a power-transmitting manner;
   an actuation detection device; and
   a power take-up element having a first end connected to and movable with the second actuation element and a second end extending to the actuation detection device such that the actuation detection device tracks movement of the power take-up element to thereby track axial movement of the second actuation element, wherein the power take-up element is configured to limit relative axial movement between the second actuation element and the power transmission element during a reset event between the second actuation element and the power transmission element.

18. The brake booster as defined by claim 17 wherein the power take-up element extends through a radially extending opening in the power transmission element and connects to the second actuation element for axial movement therewith within the opening.

* * * * *